United States Patent Office 3,843,400
Patented Oct. 22, 1974

3,843,400
SOLID ELECTROLYTE CELL
Kenneth C. Radford, Pittsburgh, and Raymond J. Bratton, Delmont, Pa., assignors to Westinghouse Electric Corporation, Pittsburgh, Pa.
Filed Sept. 18, 1972, Ser. No. 290,046
Int. Cl. C23c
U.S. Cl. 117—227         19 Claims

ABSTRACT OF THE DISCLOSURE

A solid electrolyte cell is made by preparing a sheet of a finely-divided solid electrolyte, such as zirconia, bonded together with an organic resin which does not leave a residue when thermally degraded. The sheet is covered with a layer of an electrode composition which includes a finely-divided solid electrode which is sinterable at a temperature at which the electrolyte is sinterable, an organic resin which does not leave a residue when thermally degraded, and a solvent for the resin. The structure is dried, turned upside down, and again covered with a layer of electrode composition, which is also dried. The electrode and electrolyte are then sintered in a single operation.

CROSS-REFERENCE TO RELATED APPLICATION

This application is related to our copending application Ser. No. 290,047 filed of even date, entitled "Sintering Aids for Calcia and Yttria-Stabilized Zirconia."

BACKGROUND OF THE INVENTION

In a solid electrolyte cell a solid electrolyte is sandwiched between two solid porous electrodes, for example, a zirconia electrolyte between platinum electrodes. A carrier for the particular cell, such as oxygen for a zirconia cell, is placed on one or both sides of the cell.

If the partial pressure of the carrier on one side of the cell exceeds the partial pressure of the carrier on the other side of the cell the carrier on the higher pressure side will transfer or pump carrier atoms in the electrolyte across the electrolyte, decreasing the higher partial pressure and generating a current in the cell according to the formula $$E = \frac{-RT}{ZF} \left( \ln \frac{P_1}{P_2} \right)$$

where E is the voltage generated, R is the gas constant, T is the temperature, Z is the number of electrons transported per electrolyte ion (4 for Zr), F is Faraday's constant, $P_1$ is the higher partial pressure, and $P_2$ is the lower partial pressure. While this cell will generate current at any temperature, as the formula indicates more current is produced at higher temperatures and the cell is therefore typically heated to about 850° C.

If a current is applied to the cell it will operate in reverse and pump the carrier from the lower pressure side to the higher pressure side. The cell can also be used to monitor the partial pressure of the carrier on one side of the cell by measuring the amount of voltage needed to nullify the voltage generated by the cell, provided the partial pressure on the other side of the cell and the temperature are known. If the partial pressure on both sides is known the cell can be used to monitor the temperature.

Cells are typically made by sintering disks made by pressing powder, or cutting an extruded rod. A paste of the electrode composition is applied to both sides of the disk and sintered, and re-applied and re-sintered several times until the electrode is sufficiently conductive. These repeated applications are necessary because a single large application usually results in cracking and peeling of the electrode. In addition to requiring many operations, this method can produce an impervious electrode, which means that the cell has to be discarded.

ADDITIONAL PRIOR ART

While various ceramics such as alumina and beryllia have been mixed with resin, laid in a sheet, covered with metal compositions, and sintered to make multi-layered substrates for electronic packaging, these structures are not intended as electrolytes since the ceramic materials do not conduct carriers except at extremely high temperatures close to the material melting points.

SUMMARY OF THE INVENTION

We have found that the entire electrode and electrolyte can be sintered in a single operation, and that a better electrolyte cell is produced as a result. The electrode and electrolyte thicknesses are more reproducible, the electrode adheres more firmly to the electrolyte, is more porous, and the porosity is more uniformly distributed. Also, the conductivity of the electrode is more uniform, and the electrode/electrolyte contact resistance is lower. With the process of this invention electrolyte cells can be made which are thinner than prior cell and which therefore offer less resistance to the passage of the carrier through them, the degree of thinness depending only on the mechanical strength desired.

DESCRIPTION OF THE INVENTION

Figure 1:
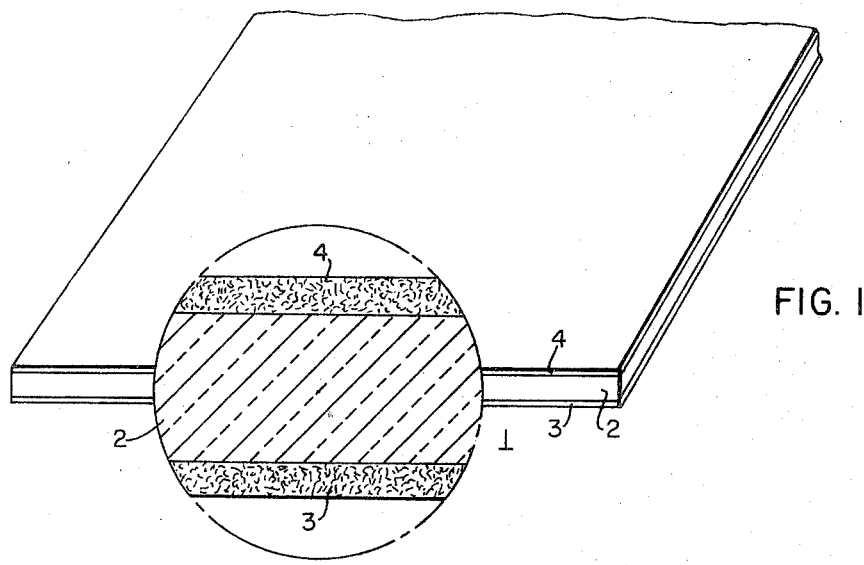
FIG. 1 is an isometric sectional view of a certain presently preferred embodiment of a solid electrolyte cell according to this invention.

In the drawing, especially the enlargement window, a solid electrolyte cell 1 is comprised of a sheet of solid impervious electrolyte 2 sandwiched between solid, highly porous electrode layers 3 and 4.

THE ELECTROLYTE

The electrolyte is a solid which is capable of conducting a carrier. In order to be capable of conducting a carrier it contains anionic vacancies, if the carrier is an anion, or cationic vacancies, if the carrier is a cation. If suitable vacancies are not already present in the electrolyte an additive is placed in solid solution with the electrolyte to provide the vacancies. Since pure zirconia undergoes a phase transformation from monoclinic to cubic when heated, which causes cracking, a stabilizer is placed in solid solution with the zirconia to retain the cubic structure and this stabilizer also performs the function of introducing anionic vacancies. A zirconia stabilizer is usually an MO or $M_2O_3$ metal oxide having cations of the appropriate size for the $Zr^{+4}$ host lattice so that a cubic solid solution of the fluorite-type structure is formed. Examples of suitable stabilizers for zirconia include MgO, CaO, $Y_2O_3$, $Sc_2O_3$, and $Sm_2O_3$. About 8 to about 15 mole percent calcia or yttria is the preferred zirconia stabilizer because of the wide range of solid solutions and lower electrolyte resistivity possible; these stabilizers are also inexpensive compared to the others.

Zirconia is the preferred electrolyte as it is inexpensive and safe to handle. Zirconia conducts oxygen as does thoria, which is, however, radioactive. Yttria is typically used to provide anionic vacancies in thoria. Other examples of electrolytes are β-alumina ($Na_2O.11Al_2O_3$) and B''-alumina ($Na_2O.5Al_2O_3$) which conduct sodium ions. Magnesia or lithia may be used to stabilize the B''-alumina structure.

It may be desirable to mix a sintering aid in with the powdered electrolyte to lower its sintering temperature so that it may be sintered at the same temperature as the electrode one would prefer to use. Our copending case "Sintering Aids for Calcia and Yttria-Stabilized Zirconia," Ser. No. 290,047 filed the same date as this application, discloses a number of very useful sintering aids for calcia and yttria stabilized zirconia. Those sintering aids are (1) about 0.5 to about 4 mole percent of a mixture of $Al_2O_3$ and $TiO_2$ in a molar ratio of about 1 to 1 to about 1 to 5, (2) $Al_2O_3$ in an amount of about 0.25 to about 5 mole percent when the stabilizer is CaO and about 0.50 to about 2 mole percent when the stabilizer is $Y_2O_3$, (3) $TiO_2$ in an amount of about 0.25 to about 5 mole percent when the stabilizer is CaO and about 1 to about 5 mole percent when the stabilizer is $Y_2O_3$, (4) about 0.5 to about 2 mole percent $SiO_2$ when the stabilizer is CaO, (5) about 0.1 to about 0.75 mole percent CaO when the stabilizer is CaO, (6) about 0.5 to about 5 mole percent MgO when the stabilizer is $Y_2O_3$, and (7) about 0.5 to about 5 mole percent $Fe_2O_3$ when the stabilizer is $Y_2O_3$. The amounts of each sintering aid are critical since too much or too little can have little effect or even the opposite effect. The first listed sintering aid is preferred as it lowers the sintering temperature the most.

The sintering temperature of the electrolyte is also lower if its particle size is very small. For example, coarse powder (i.e., −325 mesh) of CaO stabilized zirconia will sinter to high density (i.e., greater than 90% theoretical density) at about 1900° C. but if the average particle size is less than about 2 $\mu$m. the zirconia sinters at about 1450 to 1500° C.

The finely-divided, electrolyte particles are held together for sintering by an organic resin which does not leave a residue when thermally degraded. If the electrolyte is to be spread with a blade it is preferably included in a composition comprising the electrolyte, about 5 to 10% (all percentages herein are by weight unless otherwise indicated) resin, about 5 to about 10% of a plasticizer for the resin, about 40 to about 50% of a solvent for the resin, and about 0.5 to about 2% of a wetting agent, where the percentages are based on the electrolyte. The composition enables a uniform layer to be easily spread. Examples of suitable resins include polyvinyl butyral, which is preferred as it works very well, acrylics, polyvinyl chloride, polystyrene, polyesters, polyimides, polyamides, polyacrylonitrile, etc. The plasticizer used will depend upon the particular resin. Examples of suitable plasticizers for polyvinyl butyral include phthalate esters and glycol derivatives. The solvent will also depend upon the resin but mixtures of 40 to 70% hydrocarbon solvent and 30 to 60% alcohol solvent such as trichloroethylene and methanol or toluene and isopropanol, work well with most butyrate resins. A mixture of toluene and methylethylketone also works well with many resins. The purpose of the wetting agent is to coat and dispose the electrolyte particles so that the binder sticks to them and they do not aggregate. Corn oil, castor oil, and various polyoxyethylenes are among the suitable wetting agents. When the above composition is prepared, the electrolyte, solvent, and wetting agent are generally milled to reduce the particle size of the electrolyte, the binder and plasticizer are mixed in thoroughly, a partial vacuum is applied to remove air bubbles, and the composition is pumped through a filter to remove any coarse powder particles or large undivided particles of resin.

THE ELECTRODE

The electrode is a conductor which is inert to the carrier and which is sinterable at a temperature at which the electrolyte is sinterable. It is also desirable that the expansion coefficient of the electrode be within 1 p.p.m./° C. of the expansion coefficient of the electrolyte in order to help prevent cracking or peeling of the electrode, but this is not always necessary and sometimes substances can be added to the electrode to prevent cracking or peeling. Depending on the satisfaction of the above requirements, suitable electrodes may include metals such as platinum, palladium, iridium, ruthenium, rhodium, or their alloys, and non-metals such as $In_2O_3$. Platinum is preferred for $ZrO_2$ since indium, ruthenium, and rhodium are more expensive and the melting temperature of palladium is too low. However, any combination of the above metals in alloy form could be used, typically Pt-Rh, or Pt-Pd alloys. If the cell is to be used with a non-oxidizing carrier or in an environment having a low partial pressure of oxygen, then tungsten, manganese, molybdenum, or any other refractory metal may be used as an electrode, the sintering being done in a reducing atmosphere such as hydrogen-nitrogen. The electrode is used in the form of a powder, preferably of up to 325 mesh particle size.

The electrode is used in a composition which includes a binder and a solvent. The binder and solvent should be compatible with the binder and solvent used in the electrolyte composition, although they need not be identical. The solvent should be capable of dissolving or softening the binder in the electrolyte composition to give good adherence of the electrode to the electrolyte.

The preferred electrode composition is the finely-divided electrode, about 5 to 20% electrolyte (based on the electrode), about 2 to about 5% binder, about 10 to about 30% solvent, about 2 to about 5% plasticizer, and about 0.5 to about 2% wetting agent, the percentages of ingredients (other than the electrolyte) being based on the amount of electrode plus electrolyte in the composition. The purposes of the presence of the electrolyte in the electrode composition are to promote the adherence of the electrode to the electrolyte, and to provide a multitude of triple points (electrode-electrolyte-carrier) where the carrier can enter the electrolyte. For these reasons it is highly desirable that some active electrolyte be present in the electrode. The electrolyte used in the electrode composition is in the form of a powder, preferably with a maximum particle size of about 20 $\mu$m. The binder, solvent, plasticizer, and wetting agent were previously described for the electrolyte composition.

METHOD OF MAKING THE CELL

The electrolyte composition is extruded, cast, or otherwise applied to a non-adhering surface such as cellulose acetate, polyethylene terephthalate (Mylar), fluorinated plastic, etc. Typically this is a horizontal surface although it could be at an angle. The composition is leveled, for example with a doctor blade, to about twice the final electrolyte thickness desired. The solvent, if any, is evaporated and the sheet is peeled off and cut to the size desired, allowing for about 16 to 20% shrinkage in size during the sintering operation.

The sheet is laid flat again and the electrode composition is applied on top of it and leveled to about twice the final electrode thickness desired. The solvent is then evaporated. If it is desired to apply some other form of electrode to the other side of the electrolyte or not to apply an electrode to the other side, the sheet can be sintered at this point. (An electrolyte cell with an electrode on only one side could be used, for example, where the carrier is a liquid conductor such as liquid sodium and it forms the other electrode.) Otherwise, the sheet is turned upside-down, and electrode composition is again applied and dried. The sheet is placed on a setter plate, heated to degrade the binder, then sintered. For a zirconia electrolyte sintering requires about 3 hours at 1450 to 1500° C.

The final cell is preferably flat but may be non-planar and is typically about an inch or so wide. The electrolyte layer is preferably leveled at about 40 to 250 mils to produce a sintered thickness of about 20 to about 125 mils, since below about 20 mils the cell lacks strength and above about 125 mils the binder in the electrolyte composition may tend to create voids in the electrolyte. The electrode is preferably applied to a thickness of about 2 to about 8 mils to give a sintered thickness of about 1 to about 4 mils since below about 1 mil conduction is poor and more than 4 mils is unnecessary and wasteful. If the cell is to be used as a monitor, the electrode can cover as little as 1% of the electrolyte surface, but for a fuel cell or pump it should cover 100% of the surface.

The following examples further illustrate this invention.

EXAMPLE 1

1500 gms. of ball-milled zirconia stabilized with 5% CaO was placed in 700 cc. of 40% toluene-60% isopropyl alcohol and 15 gms (1%) of an alkyl polyethylene glycol ether dispersing agent was added. After ball-milling for 24 hours, 75 gms (5%) of a binder of polyvinyl butyral and 75 gms (5%) of a polyalkylene glycol plasticizer were added. This mixture was ball-milled for another 24 hours to produce a creamy slurry having a viscosity of 2000 cps. This slurry was de-aired under a partial vacuum and was then cast onto a horizontal sheet with a doctor blade set at 0.050 inches.

After evaporating the solvent, a flexible tape 0.043 inches thick, 6 inches wide and 6 feet long was obtained. In order to determine the sintered density of the electrolyte, pieces of this tape were sintered at about 1480° C.; the density was 93% of the theoretical density.

A —325 mesh Pt powder was mixed with 10% (of the Pt) very fine $Y_2O_3$-stabilized zirconia powder in about 15% (of solids) of a 55% diacetone alcohol-45% xylene solvent until finely dispersed. Three percent (of the Pt and $ZrO_2$) polyvinyl butyral and 6% (of the Pt and $ZrO_2$) plasticizer were added and mixing was continued until a smooth paste of a viscosity suitable for screen printing (100,000 cps.) was obtained. This paste was applied to a piece of the electrolyte tape, dried, applied to the other side, and dried again to form a 4 mil thick electrode layer on each side. The tape was sintered at 1450° C. for 3 hours in air. The resulting electrolyte cell had an impervious $ZrO_2$ electrolyte layer in between two very adherent, porous electrode layers.

Figure 2:
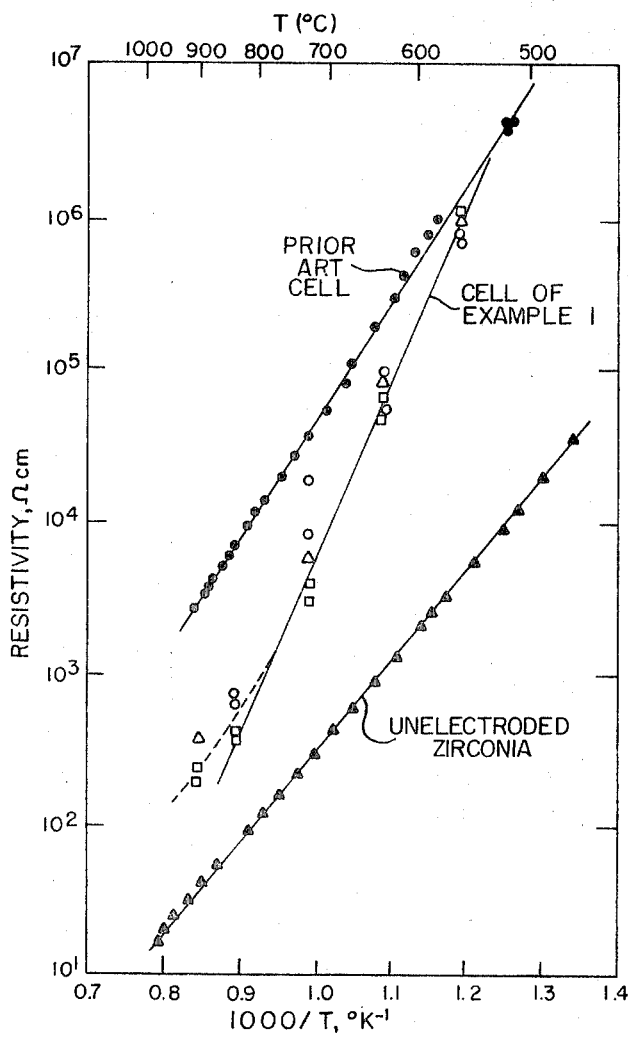
FIG. 2 is a graph comparing the resistivity of the cell of this invention to other cells.

The resistivity of the cell was measured and compared to the resistivity of the same sintered zirconia with no cofired electrodes, and to a prior art electrolyte cell. The prior art cell was prepared using the same materials except that the zirconia was pressed into a disk and sintered, then electrode layers were applied, sintered, re-applied, and re-sintered to each side. FIG. 2 shows that the cell of this example had a resistivity which was lower than the resistivity of the prior art cell and which approached the resistivity of the unelectroded zirconia. (The curve for the cell of this example in FIG. 2 is the result of tests on three cells.)

EXAMPLE 2

Sheets of 5% CaO-stabilized zirconia of the same composition and thickness used in Example 1 were prepared which contained either 2 mole percent $Al_2O_3$ or 5 mole percent $TiO_2$ as sintering aids. Pellets of 5% CaO-stabilized zirconia ½" diameter by ⅛ to ¼" thick were pressed under 30,000 p.s.i. with 1% polymethylmethacrylate binder and *either* or sintering aid, 2 mole percent $Al_2O_3$, or 5 mole percent $TiO_2$. The sheets and pellets were sintered together at 1480° C. for 3 hours. The following table gives the densities before and after sintering.

| | Sintering aid | Unsintered | Sintered |
|---|---|---|---|
| Pellets | None | 62.04 | 85.93 |
| | 2 mole percent $Al_2O_3$ | 61.42 | 89.22 |
| | 5 mole percent $TiO_2$ | 61.70 | 93.42 |
| Sheets | 2 mole percent $Al_2O_3$ | 47.80 | 91.89 |
| | 5 mole percent $TiO_2$ | 47.80 | 92.43 |

The above results show that even though the unsintered densities of the sheets were about 23% less than the unsintered densities of the pellets, the sintered densities of the sheets were at least as high as the sintered densities of the pellets.

We claim:

1. A method of making a solid electrolyte cell comprising:
   (A) preparing a sheet of an electrolyte composition comprising a finely-divided, solid, sinterable electrolyte having ionic vacancies capable of conducting a carrier, and a first synthetic, organic resin which does not leave a residue when thermally degraded;
   (B) covering said sheet with an electrode composition comprising a finely-divided, solid electrode inert to said carrier which is sinterable at a temperature at which said electrolyte is sinterable, a second, synthetic, organic resin which does not leave a residue when thermally degraded, and a solvent for said second, synthetic, organic resin;
   (C) evaporating said solvent;
   (D) thermally degrading said first and second, synthetic, organic resins; and
   (E) in a single operation sintering said electrolyte and said electrode.

2. A method according to Claim 1 wherein said covered sheet is turned upside-down after step (C), and steps (B) and (C) are repeated before performing steps (D) and (E).

3. A method according to Claim 1 wherein the particle size of said electrolyte is less than about 2 $\mu$m. and the particle size of said electrode is less than about 325 mesh.

4. A method according to Claim 1 wherein said electrolyte is selected from the group consisting of stabilized zirconia, thoria, $\beta$-alumia, and ternary $\beta''$-alumina, and said electrode is selected from the group consisting of platinum, palladium, iridium, osmium, ruthenium, rhodium, molybdenum, manganese, tungsten and alloys thereof, and $In_2O_3$.

5. A method according to Claim 4 wherein said electrode is platinum.

6. A method according to Claim 4 wherein said electrolyte is stabilized zirconia.

7. A method according to Claim 6 wherein said zirconia is stabilized with about 8 to about 15% of a compound selected from the group consisting of calcia and yttria.

8. A method acording to Claim 7 wherein said electrolyte composition contains a sintering aid selected from the group consisting of
   (1) about 0.5 to about 4 mole percent of a mixture of $Al_2O_3$ and $TiO_2$ in a molar ratio of about 1 to 1 to about 1 to 5;
   (2) $Al_2O_3$ in an amount of about 0.25 to about 5 mole percent when said stabilizer is calcia and about 0.50 to about 2 mole percent when said stabilizer is yttria;
   (3) $TiO_2$ in an amount of about 0.25 to about 5 mo'e percent when said stabilizer is calcia and about 1 to about 5 mole percent when said stabilizer is yttria;
   (4) about 0.5 to about 2 mole percent $SiO_2$ when said stabilizer is calcia;
   (5) about 0.1 to about 0.75 mole percent CaO when said stabilizer is calcia;
   (6) about 0.5 to about 5 mole percent MgO when said stabilizer is yttria; and
   (7) about 0.5 to about 5 mole percent $Fe_2O_3$ when said stabilizer is yttria.

9. A method according to Claim 8 wherein said sintering aid is about 0.5 to about 4 mole percent of a mixture of $Al_2O_3$ and $TiO_2$ in a molar ratio of about 1:1 to about 1:5.

10. A method according to Claim 1 wherein said electrolyte is about 20 to about 125 mils thick and each electrode is about 1 to about 4 mils thick.

11. A method according to Claim 1 wherein said solvent is a mixture of about 40 to about 70% hydrocarbon solvent and about 30 to about 60% alcohol solvent.

12. A method according to Claim 11 wherein said hydrocarbon solvent is toluene and said alcohol solvent is isopropanol.

13. A method according to Claim 1 wherein said sheet is prepared by spreading said electrolyte composition over a flat, non-adherent surface with a doctor blade.

14. A method according to Claim 1 wherein said resin in said electrolyte composition and said resin in said electrode composition are identical.

15. A method according to Claim 14 wherein said resin is polyvinyl butyral.

16. A solid electrolyte cell prepared according to the method of Claim 1.

17. A method of making an electrolyte cell comprising:
(A) preparing an electrolyte composition comprising
  (1) stabilized zirconia having an average particle size less than about 2 μm.;
  (2) about 5 to about 10% of a first, synthetic, organic resin which does not leave a residue when thermally degraded;
  (3) about 5 to 10% of a platicizer for said resin;
  (4) about 40 to about 50% of a solvent for said resin; and
  (5) about 0.5 to about 2% of a wetting agent, where percentages are based on the amount of stabilized zirconia;
(B) evenly spreading said electrolyte composition over a flat, non-adherent surface to a thickness of about 40 to about 250 mils;
(C) preparing an electrode composition comprising
  (1) platinum having a particle size of up to about 325 mesh;
  (2) about 5 to about 20% (of the platinum) stabilized zirconia having a particle size of less than about 20 μm.;
  (3) about 2 to about 5% of a second, synthetic, organic resin which does not leave a residue when thermally degraded and which is compatible with said first resin;
  (4) about 10 to about 30% of a solvent for said second resin;
  (5) about 2 to about 5% of a plasticizer for said second resin; and
  (6) about 0.5 to about 2% of a wetting agent, where the percentages of second resin, solvent, plasticizer, and wetting agent are based on the platinum and stabilized zirconia;
(D) evaporating said solvent;
(E) evenly spreading said electrode composition over said electrolyte composition to a thickness of about 1 to about 8 mils;
(F) evaporating said solvent in said electrode composition;
(G) turning said electrolyte and electrode upside-down;
(H) evenly spreading said electrode composition over said electrolyte to a thickness of about 1 to about 8 mils; and
(I) evaporating said solvent in said electrode composition, thermally degrading said resins, and, in a single operation sintering said stabilized zirconia and platinum.

18. A method according to Claim 17 wherein said flat, non-adherent surface is horizontal.

19. A solid electrolyte cell made according to the method of Claim 17.

References Cited
FOREIGN PATENTS 1,809,622   7/1969   Germany _____204—195 S MAYER WEINBLATT, Primary Examiner U.S. Cl. X.R.

117—213; 204—195; 252—503, 514